United States Patent [19]

Snyder

[11] Patent Number: 4,720,000
[45] Date of Patent: Jan. 19, 1988

[54] TORQUE WRENCH WITH CLUTCHES

[75] Inventor: Robert F. Snyder, Hamden, Conn.

[73] Assignee: Raymond Engineering Inc., Middletown, Conn.

[21] Appl. No.: 885,969

[22] Filed: Jul. 15, 1986

[51] Int. Cl.$^4$ .................... F16D 67/02; F16D 13/74; B25B 17/02

[52] U.S. Cl. .................... 192/7; 192/113 B; 81/57.3; 188/336; 188/264 B; 184/108

[58] Field of Search .............. 192/7, 107 T, 113 B; 81/57, 57.3; 188/264 B, 264 E, 336; 184/6.4, 108

[56] References Cited

U.S. PATENT DOCUMENTS

| | | | |
|---|---|---|---|
| 960,341 | 6/1910 | Kincaid | 184/108 X |
| 2,680,983 | 6/1954 | Miller | 81/57.3 |
| 3,073,424 | 1/1963 | Russell | 192/113 B |
| 3,247,935 | 4/1966 | Marland | 188/264 B |
| 3,258,999 | 7/1966 | Scheithauer et al. | 81/57.3 |
| 3,347,345 | 10/1967 | Rogers et al. | 192/113 B X |
| 3,497,044 | 2/1970 | Kalns | 192/107 T X |
| 4,023,656 | 5/1977 | Kuwahara et al. | 188/264 B |
| 4,231,454 | 11/1980 | Bickford et al. | 81/57.3 X |

FOREIGN PATENT DOCUMENTS

646487 10/1962 Italy .................... 192/107 T
547240 8/1942 United Kingdom ............ 192/113 B

*Primary Examiner*—Leslie Braum
*Assistant Examiner*—Richard M. Lorence
*Attorney, Agent, or Firm*—Fishman & Dionne

[57] ABSTRACT

The external sleeve of a slip brake in a torque wrench with a pair of clutches in series is provided with a spiral groove which houses lubricant. "O" rings at opposite ends of the external sleeve cooperate with an internal sleeve to seal in the lubricant. The slip brake of the present invention incorporates an internal split ring or drum which is adjustable to set the desired bias load of the slip brake. However, the split ring or drum is encased in a very thin steel sleeve which is attached, as by soldering, to the split ring. The outer surface of the thin steel sleeve abuts the inner surface of the outer ring and serves as the brake drum. Although the split ring is encased in a thin steel sleeve, the sleeve is thin enough (from about 0.025" to 0.030" thick) so that this sleeve will stretch when the split ring is expanded to increase the bias load on the slip brake. Thus, the thin metal sleeve cooperates with the grooved external sleeve and the "O" rings to provide a sealed in source of lubricant which assures a smooth rotary operation of the slip brake when the input force is delivered to relax the torquing load.

11 Claims, 5 Drawing Figures

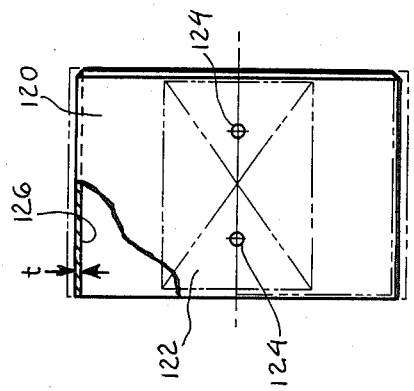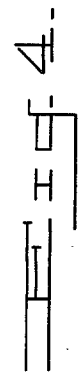
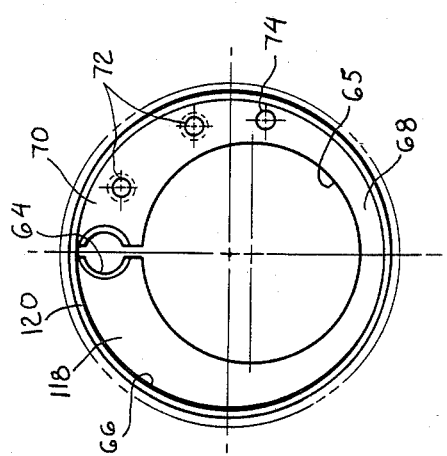
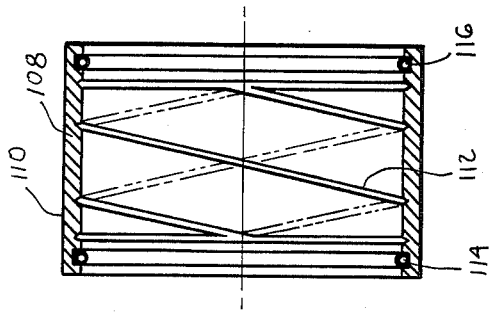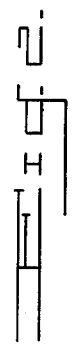

TORQUE WRENCH WITH CLUTCHES

BACKGROUND OF THE INVENTION

This invention relates to the field of torque wrenches. More particularly, this invention relates to the field of manually operated torque wrenches in which the potential for drive back or kick back poses a hazard to the operator of the wrench. Even more particularly, this invention relates to an improvement to the torque wrench of U.S. Pat. No. 4,231,454.

U.S. Pat. No. 4,231,454 is owned by the assignee of the present application, and the entire contents of U.S. Pat. No. 4,231,454 are incorporated herein by reference. While wrenches built according to U.S. Pat. No. 4,231,454 are suitable for their intended purpose and are an improvement over the prior art, field experience has revealed the existence of a problem which needs to be corrected. Specifically, field experience has shown that with some wrenches the operation of the slip brake (split ring 50 and sleeve 54) may become erratic. Specifically, the slip brake may hang up or operate in a jumping or chattering manner rather than operating with a smooth rotary motion as is desired when the direction of input force is reversed to relax the torquing load.

It has been determined that the problem with the slip brake of U.S. Pat. No. 4,231,454 is the result of the lack of adequate lubrication between the relatively moveable parts of the slip brake.

SUMMARY OF THE INVENTION

The present invention presents a modified and improved design of the slip brake to achieve adequate lubrication and overcome the existing problem.

In accordance with the present invention, the external sleeve of the slip brake is provided with a spiral groove which houses lubricant. "O" rings at opposite ends of the external sleeve cooperate with an internal sleeve to seal in the lubricant. The slip brake of the present invention incorporates the internal split ring or drum which is adjustable to set the desired bias load of the slip brake. However, the split ring or drum is encased in a very thin steel sleeve which is attached, as by soldering, to the split ring. The outer surface of the thin steel sleeve abuts the inner surface of the outer ring and serves as the brake drum. Although the split ring is encased in a thin steel sleeve, the sleeve is thin enough (from about 0.025" to 0.030" thick) so that this sleeve will stretch when the split ring is expanded to increase the bias load on the slip brake. Thus, the thin metal sleeve cooperates with the grooved external sleeve and the "O" rings to provide a sealed in source of lubricant which assures a smooth rotary operation of the slip brake when an input force is delivered to relax the torquing load.

The wrench of the present invention also incorporates an external grease fitting to fill and replenish the lubricant supply, an external relief valve for the lubricant, and an external indicator to indicate when more lubricant is needed.

BRIEF DESCRIPTION OF THE DRAWINGS

Referring now to the drawings, wherein like elements are numbered alike in the several Figures:

FIG. 2 is an enlarged sectional elevation view of the external sleeve of the slip brake.

FIG. 3 is an enlarged bottom plan view of the split ring and thin sleeve.

FIG. 4 is an enlarged side view, partly in section, of the thin sleeve.

Figure 1:
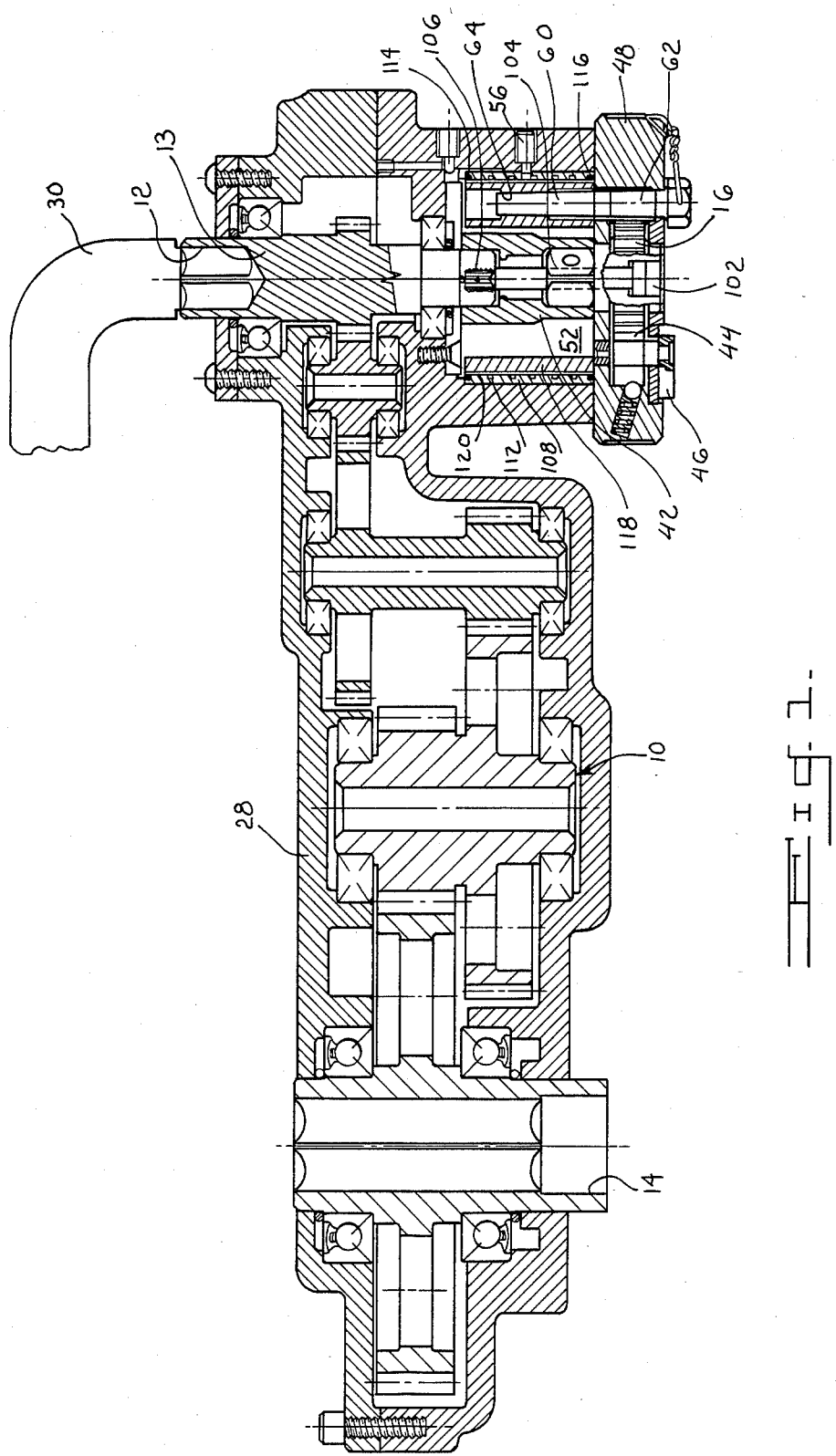
FIG. 1 is a sectional elevation view of the wrench of the present invention.

In the several Figures, and particularly in FIG. 1, the parts are numbered as in U.S. Pat. No. 4,231,454 where the parts are the same.

DESCRIPTION OF THE PREFERRED EMBODIMENT

Other than the improvement made by the present invention; the torque wrench shown in FIG. 1 is essentially the same as that shown in FIG. 3 of U.S. Pat. No. 4,231,454. By way of review of the torque wrench, casing 28 houses gear train 10 which extends from input socket 12 and shaft 13 to output socket 14. Output socket 14 is adapted to receive a shaft and a socket element sized to envelope a fastening element to which torque is to be applied for either tightening or loosening. Actuating handle 30 is positioned in input socket 12. As is known in the art, it is necessary to ground the wrench casing such as by pins or an adapter connected to the casing in a manner well known in the art. An extension 42 is mated to rotating shaft 13 to rotate with shaft 13. A ratchet wheel 16 is mated to shaft 42 to rotate with shaft 13 such as by a "snap-on" connection. Ratchet wheel 16 interacts with two way pawl element 44 which is operated by selector level 46 to determine the direction in which the ratchet wheel will be free running or locked. Two way pawl element 44 is maintained in its selected position by a spring loaded ball mechanism. Depending on the position of selector lever 46, the ratchet may be free running in either the clockwise or counterclockwise direction and locked in the opposite direction, thus, constituting a one way clutch which is reversible in direction. The entire ratchet mechanism may be any commercially available two way ratchet mechanism which defines, in effect, a pair of one way, oppositely directed clutches depending on the selection of the pawl lever. The entire ratchet mechanism is mounted in an end plate 48 which is connected by screw fasteners to a split ring 118 located in a chamber 52 in casing 28. In accordance with the present invention, the ratchet wheel 16 and end plate 48 are retained in place by an elongated screw fastener 102 which passes through a central passage 104 in the "snap-on" fastener element and is threaded into shaft 13 at 106.

In accordance with the present invention, a sleeve 108 (see FIG. 2) having a smooth outer surface 110 and a spirally grooved inner surface 112 is located in chamber 52. "O" ring seals 114 and 116 are positioned at opposite ends of sleeve 108. Spiral groove 112 is filled with a lubricating grease, and the "O" rings seal the ends of sleeve 108 against an abutting surface to prevent loss of the grease. Sleeve 108 firmly engages the wall of chamber 52 of casing 28 by a press fit so that the sleeve is fixed relative to casing 28. A retaining screw 56 passes through a mating hole in bronze sleeve 108 to also lock bronze sleeve 108 against both linear and rotational movement in casing 28.

A split ring 118 (which is, per se, essentially identical to split ring 50 of U.S. Pat. No. 4,231,454 but does not have the groove 58 thereof) is positioned within sleeve 108. However, contrary to the structure of U.S. Pat. No. 4,231,454 where the split ring 50 is in direct contract with the sleeve 54, split ring 118 is not in direct contact with the inner surface of sleeve 108. Rather, split ring 118 is encased in a very thin steel sleeve 120, the outer surface of which abuts the inner grooved surface of sleeve 108 to form a brake drum or slip surface of the slip brake. Steel sleeve 120 is originally 1/16" thick; but, after being positioned on split ring 118 (or a suitable mandrel), it is machined down to a wall thickness "t" of from 0.025" to 0.030". That makes sleeve 120 thin enough so that it will stretch when split ring 118 is expanded. This expandability of sleeve 120 is indicated by the broken lines in FIGS. 3 and 4. Sleeve 120 is bonded to split ring 118 by a silver solder 122 introduced between sleeve 120 and split ring 118 through holes 124 in sleeve 120. Sleeve 120 is friction fit within sleeve 108 against the grooved inner surface thereof. Sleeve 120 serves not only as the brake drum or slip surface of the slip brake, but it also serves as the sealing surface for "O" rings 114 and 116. Thus, sleeve 120 prevents loss of the lubricating grease out of the ends of the slip brake or through the split in ring 118. Sleeves 108 and 120 constitute the two slip surfaces of a slip brake or clutch, with the load between the slip surfaces being adjustable by expanding drum or split ring 118 to expand sleeve 120.

As in U.S. Pat. No. 4,231,454, a tapered pin 60, the end 62 of which is threaded into a threaded opening in plate 48, extends into a tapered portion 64 of a passageway in split ring 118, so that the gripping load between split ring 118 in concert with sleeve 120 and bronze sleeve 108 can be adjusted to exceed the desired output torque of the wrench.

Referring now to FIGS. 2-4, some of the details of split ring 118 can be seen. FIG. 3 is a view looking at the end of sleeve 118 as it would be seen with the end plate 48 removed. The inner surface 65 of split ring 118 varies in thickness from a thin section 68 to a diametrically opposed thick section 70. Ring 118 is split at its thickest part, and tapered groove 64 (which receives tapered pin 60) is located in thick section 70. The fact that the thinnest portion 68 of split ring 118 is diametrically opposite to the location of the split facilitates the flexing or expansion of split ring 118 when tapered pin 60 is advanced into tapered groove 64 to spread the two halves of the tapered ring to increase the load of the slip brake. End plate 48 is secured to split ring 118 by a pair of screws which extend through end plate 48 and engage apertures 72 in split ring 118. A locating dowel also extends from end plate 48 into a locating hole 74 in split ring 118 to locate the end plate.

As disclosed in U.S. Pat. No. 4,231,454, the bottom of split ring 118 may be undercut or relieved, this undercut or relief extending over the major portion of the lower surface. This undercut facilitates the flexing of the split ring in response to changes in location of tapered pin 60. The sleeve 120 envelopes split ring 118, with the inner surface 126 of sleeve 120 being in abutting contact with the outer surface 66 of ring 118; and sleeve 120 is secured to ring 118 by the solder in area 122. Thus, the split ring 118 and sleeve 120 become a unified structure having the adjustability of split ring 118 to vary the slip brake load and the continuous surface of sleeve 120 to retain the lubricating grease in spiral groove 112.

In the operation of the wrench of FIGS. 1-4, rotation of input handle 30 in one direction, e.g., clockwise, will result in an output at output socket 14 to tighten a fastening element. The selector lever 46 of the pawl and ratchet mechanism is positioned to permit the ratchet to free-wheel in the clockwise direction in this mode of operation. As the fastening element is subjected to an increasing torque load, an equal and opposite reaction force builds through the gear train 10 back to shaft 13 and shaft 42, but the operation of the serially connected ratchet mechanism and the slip brake comprising split ring 118, sleeve 120 and bronze sleeve 108 prevent any kick back or counterclockwise rotation of shafts 42 and 13 and input handle 30. Tapered pin 60 is positioned in its groove 64 so as to provide an appropriate loading of split ring 118 against grounded bronze sleeve 108 which is slightly greater than the maximum reaction torque to be developed by the wrench at this point of the gear train.

When torquing of the fastening element has been completed and it is desired to remove the wrench from the fastening element, the operator merely reverses the direction of force applied to input handle 30; i.e., he urges input handle 30 in the counterclockwise direction. The counterclockwise force on input handle 30 is transmitted via shaft 13 and shaft 42 to ratchet wheel 16. Since pawl 44 engages the teeth of the ratchet wheel 16 to prevent relative counterclockwise motion of the ratchet wheel with respect to pawl 44, the counterclockwise force is transmitted through pawl 44 to end plate 48 in which the pawl is mounted. When the bias load between split ring 118 and bronze sleeve 108 is exceeded, end plate 48 and split ring 118 will rotate, i.e., slip relative to bronze sleeve 108 in counterclockwise direction, thus permitting relaxation of the reaction force in the wrench. Wrenches of this type are usually provided with an output gauge to the torque load, and when the output gauge reads "0" the operator is thereby informed that he can remove the wrench from the fastening element. If no readout device is provided, the operator can still, by tactile feel, sense the total relaxation of the torquing load.

In the present invention, the presence of lubricating grease in spiral groove 112 results in a smooth and even motion between sleeve 108 and sleeve 120 during operation of the slip brake. This is a significant improvement over the unit of U.S. Pat. No. 4,231,454 which, in field use, has been susceptible to erratic operation in that, with time, the slip brake thereof might hang up or operate in a jumping or chattering manner when the relaxation load was imposed on it. It will, of course, be understood that the presence of the grease in groove 112 does not prevent the imposition of the desired load between sleeves 108 and 120 to keep the brake stationary during torquing operation; rather, the grease serves only to insure smooth operation during the relaxation step.

Figure 5:
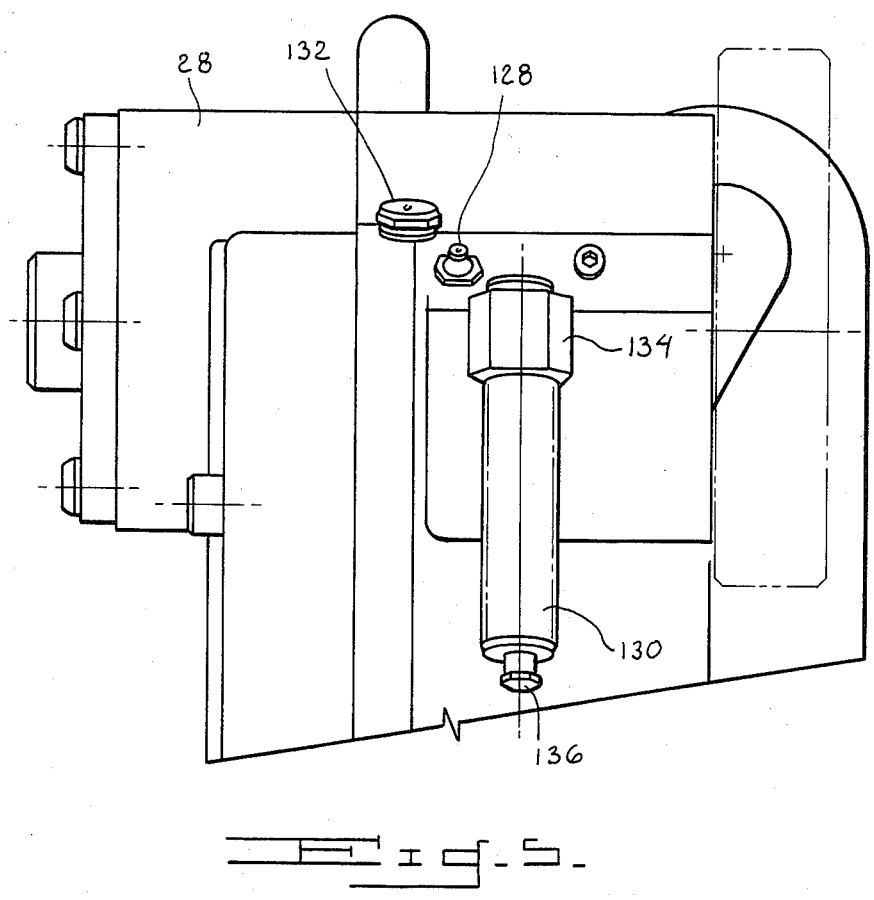
FIG. 5 is a view of part of the exterior of the wrench showing the grease fitting, relief valve and lubricant level indicator.

Referring to FIG. 5, which shows the part of outer casing 28 in the vicinity of the slip brake, structure is shown by which the grease may be supplied. The grease may be introduced into spiral groove 112 through a grease filling 128 which communicates via a suitable passage (not shown) in the housing. With a reservoir 130, a pressure relief valve 132 communicates with groove 112 or reservoir 130 to prevent overpressurization of the grease in groove 112 (which could cause separation between sleeves 108 and 120 and lead to undesired slippage of the brake. Grease reservoir 130 holds a reservoir of grease and reservoir 130 communicates with groove 112 through suitable passageways (not shown) in the wrench. Reservoir 130 has a spring loaded piston in housing 134 which maintains the grease under a suitable supply pressure to feed groove 112. A marker rod 136 extends from the piston to the exterior of housing 130, the marker rod having indicia thereon to inform the wrench operator of the level of grease in the unit.

As with the wrench of U.S. Pat. No. 4,231,454, the one caution which must be observed by the operator of the wrench of the present invention is that the ratchet lever or other control mechanism for the one way clutch must not be reversed while the wrench is in a torqued state. If that were to be done, the restraint of the one way clutch would be lost, and an immediate and severe kick back would be encountered.

From the foregoing description it can be seen that the wrench of the present invention incorporates and preserves all of the important features and advantages of the wrench of U.S. Pat. No. 4,231,454 while adding the significant improvement hereof whereby the slip brake operates in a smooth and reliable manner in the relaxation mode.

Elements present in both this application and in U.S. Pat. No. 4,231,454 are numbered as in the patent. New elements added by the improvement of this invention are numbered in the 100 series, i.e., 102, 104, etc.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. In a torque wrench having:
  a casing;
  torque transmission means in said casing;
  input means connected to said transmission means for delivering an input force to said transmission means in response to movement of said input means in a first direction;
  output means connected to said transmission means for imposing a torque load on an element to be torqued;
  one way clutch means coupled to said input means to prevent reaction forces in said wrench from acting on said input means to cause undesired movement of said input means in a direction opposite to said first direction; and
  slip brake means connected to said one way clutch means and in series with said one way clutch means, said slip brake means being responsive to a predetermined load on said input means in a direction opposite to said first direction to relax the reaction forces in said wrench;
  said improvement comprising:
  first sleeve means having an outer surface and an inner surface, said outer surface of said first sleeve means being grounded to said casing;
  lubricant retaining means at said inner surface of said first sleeve means;
  split ring means positioned within said first sleeve means;
  second sleeve means around and connected to said split ring means, said second sleeve means being continuous so as to retain lubricant within said lubricant retaining means, said second sleeve means having an outer surface, said outer surface of said second sleeve means abutting said inner surface of said first sleeve means; and
  said first sleeve means, said second sleeve means and said split ring means being parts of said slip brake means.

2. The torque wrench of claim 1 including:
  means to adjust said split ring means to vary the load on said slip brake means, said second sleeve means being sufficiently thin so that it expands or contracts in response to adjustments to said split ring means.

3. The torque wrench of claim 2 wherein:
  said lubricant retaining means includes groove means in the inner surface of said first sleeve means.

4. The torque wrench of claim 3 including:
  seal means at opposed ends of said first sleeve means.

5. The torque wrench of claim 1 wherein said lubricant retaining means includes:
  spiral groove means in the inner surface of said first sleeve means.

6. The torque wrench of claim 2 including:
  means to supply lubricant to said lubricant retaining means.

7. The torque wrench of claim 6 including:
  means to indicate the level of lubricant in said wrench.

8. The torque wrench of claim 1 wherein:
  said second sleeve means is comprised of steel.

9. The torque wrench of claim 1 wherein:
  said second sleeve means has a wall thickness of from about 0.025 to about 0.030 inch.

10. The torque wrench of claim 1 wherein:
  said outer surface of said second sleeve means has a friction fit with said inner surface of said first sleeve means.

11. The torque wrench of claim 1 wherein:
  said second sleeve means is bonded to said split ring means.

* * * * *